O. S. & T. C. ST. JOHN.
Potato Digger.
No. 76,953.
Patented April 21, 1868.
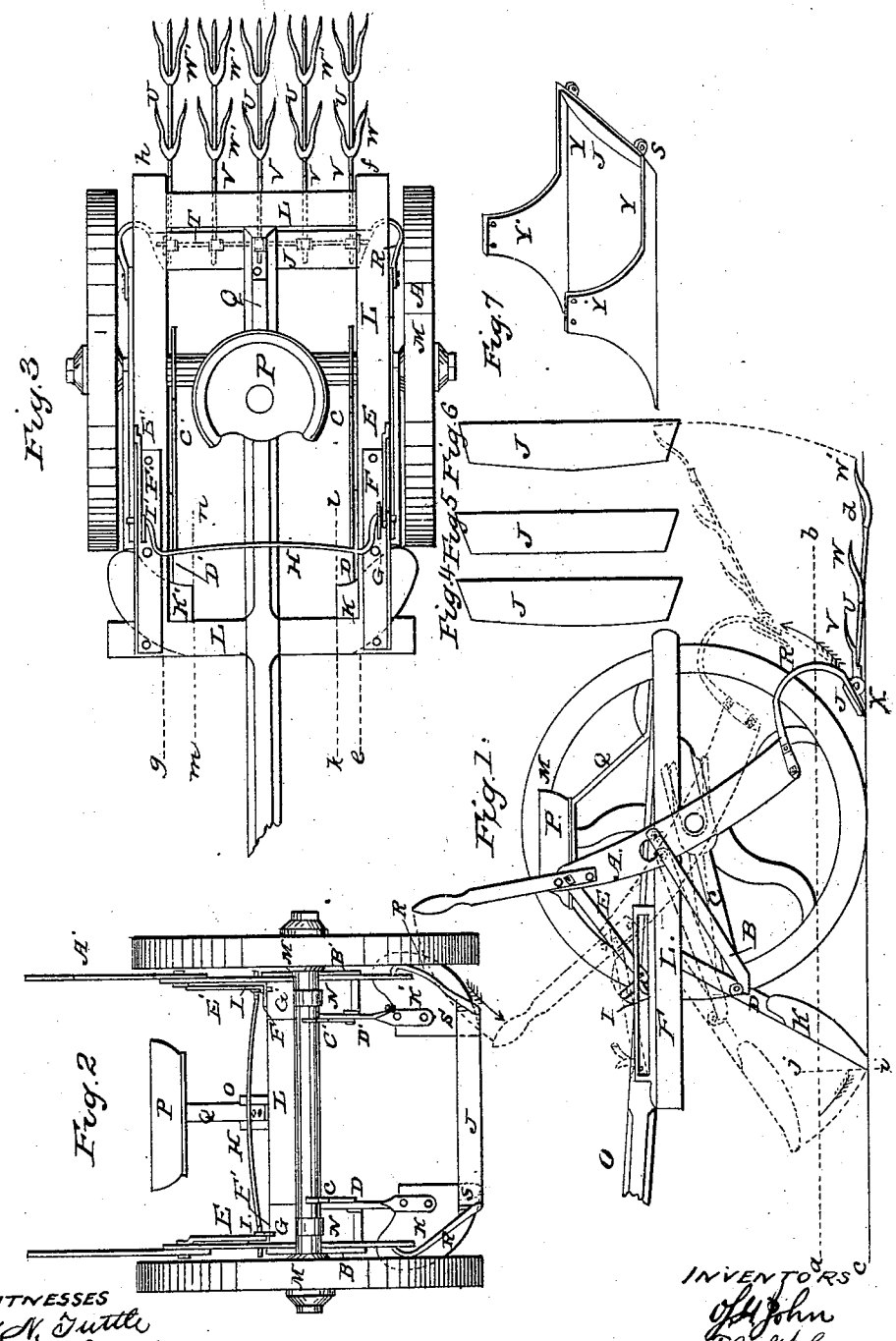

United States Patent Office.

O. S. ST. JOHN AND T. C. ST. JOHN, OF WILLOUGHBY, OHIO.

*Letters Patent No. 76,953, dated April 21, 1868.*

IMPROVEMENT IN MACHINE FOR HARVESTING POTATOES.

*The Schedule referred to in these Letters Patent and making part of the same.*

TO ALL WHOM IT MAY CONCERN:

Be it known that we, O. S. ST. JOHN and T. C. ST. JOHN, both of Willoughby, in the county of Lake, and State of Ohio, have invented a new and useful Machine for Harvesting Potato and other Root Crops; and we do hereby declare that the following is a full and exact description thereof, reference being had to the accompanying drawings, in which—

Figure 1 is a side elevation thereof, the near wheel being removed to exhibit its construction more fully.

Figure 2, an elevation of the rear end, the "drag-separator" hereinafter mentioned being detached.

Figure 3, a top or plan view of the whole machine.

Figures 4, 5 and 6, three separate forms for the cutting-edge of the broad knife or blade hereinafter mentioned; and Figure 7, a perspective view of the "extra attachment," to be used on said machine when operating among long and straggling vines, as will be explained.

Similar letters of reference indicate the same parts in all the figures.

This invention relates to a machine for digging potatoes, and which is also adapted for harvesting other root crops.

Its novelty consists in the employment of a broad knife, of a length corresponding to the width of the row of hills, located in the rear of the machine, and operating so as to pass through the soil immediately below the potatoes, and so as to thoroughly break up and loosen the earth for the effectual penetration and action of a "drag-separator," which is attached to the back of the broad knife before mentioned. This "drag-separator" is of peculiar construction, and operates in a novel manner, as will be hereafter explained. By means of a pair of ploughs placed in front of the machine, the whole row is trimmed square at the sides, by a vertical cut, to a required depth; thus the soil, for a given space throughout the entire row, is cut horizontally and vertically, and thereby broken and mellowed, so as to allow the "drag-separator" to separate and turn out the potatoes in the most perfect manner.

Provision is also made for attaching to the machine, in place of the broad knife before mentioned, the extra attachment before spoken of. It consists of a similar knife, provided with extended horizontal sides and front elevators. It is intended to operate in potato-fields where the tops or vines have grown long and spreading, and are still green, so that they can be taken up and thrown on the hills to prevent clogging.

The following description will enable others skilled in the art to construct and use our machine.

L, fig. 1, is a rectangular carriage-frame mounted on a pair of wheels, M M, the axle-tree of which is secured under the said frame by boxes N N, as seen in fig. 2. O, fig. 1, is the tongue or pole by which the machine is drawn. P is a driver's seat, supported on said pole by a spring-support, Q. On the top of the forward part of said frame L is secured a pair of guide-plates, F F', one on each side, as seen in fig. 3. Said guide-plates are provided with long open slots in their vertical sides.

Supported on the wheel-axles are long levers, A A', fig. 2, of the form shown in fig. 1. They are placed on said axles so as to oscillate back and forth. On the lower end of said levers is secured, by straps R R, fig. 3, a broad knife or blade, J. The said knife is of steel plate, and the straps may either be welded to it or fastened with bolts, at pleasure. It will be observed that the cutting-direction of the said knife is transverse or across the machine. Back of said knife J is hung, on bearings, S S, figs. 1 and 2, a species of drag, which we term a "drag-separator." It is constructed as follows: On a shaft, T, fig. 3, are secured five arms, U. The outside ones are fixed on the shaft. The intermediate ones have a certain degree of vertical play, limited by an angular extension, X, fig. 1, of their ends impinging on the back of the knife T. On the upper part of each rod are arranged, at equal intervals, three sets of fingers or short branch-rods, V W W'. The first row are single branches, the second double, and the third triple. All said branches are bent or curved, as seen in fig. 1. The angular extensions before mentioned, of the intermediate rods, will prevent their falling below a given pitch, and are also of use when elevating the working parts of the machine, as the drag-separator will be correspondingly raised from contact with the ground.

The extra attachment, represented in fig. 7, is composed of two extended narrow sides, Y. These sides, at their back ends, hold the broad knife J before mentioned. At the forward ends of said extended sides are erected two thin share-blades, Y', having hollow curved edges in front. Holes are made through the top ends of said share-blades for the purpose of securing the said attachment to the levers A A'.

Forward of the frame, and pivoted by their standards D D' to the inner sides of the side-rails, are two ploughs, K K', fig. 2. These ploughs have a forward and back vibration, the movement being controlled by connecting-rods B B', fig. 3, and the oscillating movement of the levers A A'. As a means for steadying the back-and-forth movement of the said ploughs, additional rods, C C', fig. 3, are pivoted to their standards D D'. These rods, it will be seen, are fork, so as to allow of their being supported on and to vibrate on the axle-tree. On the upper ends of the levers A A' are pivoted rods E E', one to each lever, as seen in fig. 3. The lower ends of said rods are provided with holes through which the turned ends of a swing-bar, H, fig. 3, are put. Said swing-bar, as will be seen in the figure, extends across the frame from one guide-plate to the other. The ends of said swing-bar are bent twice at right angles, the extreme bends passing through the holes of the lower ends of the arms E E'. On these bent portions are secured pawls I I', which catch into holes G G', fig. 3, in the before-mentioned guide-plates. The sliding movements of the said arms E E' are controlled by the bent portion of the swing-bar projecting through the long horizontal open slots of the said guide-plates. The upper parts of the levers A A' are provided with suitable handles for the use of the driver.

The operation is as follows: After estimating the proper depth the knife should penetrate under the hills, and so as to avoid injuring the potatoes, the catch-holes of the guide-plates, into which the pawls drop, are marked. We will suppose, for illustration, the penetration of the knife is gauged to cut on the line $c\,d$, fig. 1, line $a\,b$ being the line of the tops of the hills. This will make a horizontal cut, throughout the length of the row, of the width indicated by the lines $e\,f\,g\,h$, fig. 3; the ploughs in front of the machine cutting a vertical depth, indicated by the line $i\,j$, fig. 1, on each side of the row, and of a width shown by the lines $k\,l\,m\,n$. It will be perceived that the whole mass of soil included within those lines is broken and loosened, and that the roots of all vines, grass, and weeds within the said space are completely severed by the passing knife, so that the before-described drag-separator, which, it will be observed, follows immediately in the wake of the said knife J, will, by its own peculiar action, separate and throw out the contents of all the hills of the row.

In potato-fields where the vines are long and green, the extra attachment, delineated in fig. 7, is to be used. It is bolted to the levers A A' in place of the simple knife arrangement. It performs the same office of the knife J. The share-blades in front are intended to pass under the straggling vines, so as to lift and deposit them on the hills.

In drawing the machine to or from the field, turning at the end of a row to the next one, or in passing obstructions, the knife, ploughs, and drag-separator are lifted clear of the ground, by the driver applying his foot to the swing-bar H, swinging it towards him, thereby releasing the pawls from the catch-holes, (this motion is indicated by the dotted lines $p$, seen in fig. 1,) at the same time pushing forward the handles of the levers A A'. The said working parts will then be raised, as seen by the dotted lines and arrows in fig. 1.

The cutting-edge of the broad knife J may be of any form that will insure its easy penetration into the soil and to sever the roots, as before stated. Three forms are suggested by figs. 4, 5, and 6.

What we claim as our invention, and desire to secure by Letters Patent, is—

1. We claim the use of the elongated flat knife or blade J and straps R R, constructed substantially as described, located and operating in the especial manner herein set forth and for the purpose stated.

2. The employment of the detachable drag-separator herein described, having the two outer arms rigid and the intermediate ones vibratory, so as to operate in the manner described, and in connection with the said knife J, as and for the purpose set forth.

3. The special use and employment of the extra attachment herein described, constructed and operating substantially as and for the purpose stated.

4. The combination of the said drag-separator and the said extra attachment, operating in the manner and for the purposes set forth.

5. The ploughs K and K', in combination with the broad knife J, operating as and for the purpose herein stated.

6. The levers A A', connecting-rods B B', forked rods C C', plough-standards D D', rods E E', guide-plates F F', provided with catch-holes G G', swing-bar H, and pawls I I', in combination with the knife J, or with the extra attachment, drag-separator, and ploughs K K', all constructed, arranged, and operating substantially in the manner and for the purposes herein set forth.

O. S. ST. JOHN,
T. C. ST. JOHN.

Witnesses:
G. N. TUTTLE,
T. C. STARK.